United States Patent [19]

Titmas

[11] Patent Number: 5,219,270

[45] Date of Patent: Jun. 15, 1993

[54] REACTION BARREL WITH ROCKET NOZZLES IN STAGGERED ALIGNMENT AND CONNECTING DUCTS OF UNEQUAL LENGTH

[75] Inventor: James A. Titmas, Kent, Ohio

[73] Assignee: Titmas and Associates Incorporated, Hudson, Ohio

[21] Appl. No.: 917,226

[22] Filed: Jul. 23, 1992

Related U.S. Application Data

[62] Division of Ser. No. 748,513, Aug. 22, 1991, Pat. No. 5,147,564.

[51] Int. Cl.$^5$ .............................................. F01D 1/32
[52] U.S. Cl. ..................................... 415/80; 210/761; 415/62; 415/63; 415/177
[58] Field of Search .................... 210/761; 415/60, 62, 415/63, 64, 68, 80, 177, 178; 60/330, 645, 39.75, 39.78

[56] References Cited

U.S. PATENT DOCUMENTS

| | | | |
|---|---|---|---|
| 47,636 | 5/1865 | Harris | 415/63 |
| 65,154 | 5/1867 | Banta | 415/80 |
| 982,035 | 1/1911 | Clapp | 415/80 |
| 4,027,483 | 6/1977 | Wahl, III | 415/80 |
| 4,086,766 | 5/1978 | Stieger | 60/330 |
| 4,100,765 | 7/1978 | Kantor | 415/80 |
| 4,141,219 | 2/1979 | Elliot | 60/645 |
| 4,430,042 | 2/1984 | House | 415/80 |
| 4,441,322 | 4/1984 | Ritzi | 415/80 |
| 4,448,024 | 5/1984 | Molini et al. | 415/80 |

FOREIGN PATENT DOCUMENTS

| | | | |
|---|---|---|---|
| 3070 | of 1900 | Denmark | 415/80 |
| WO79/969 | 11/1979 | PCT Int'l Appl. | 415/80 |
| 7554 | of 1838 | United Kingdom | 415/80 |

*Primary Examiner*—Joseph W. Drodge
*Attorney, Agent, or Firm*—Renner, Kenner, Greive, Bobak, Taylor & Weber

[57] ABSTRACT

A method and apparatus for recovering energy from a wet oxidation products stream flow includes channeling the stream flow to an energy recovery assembly (10). The assembly (10) includes a rotatable reactor barrel (32). The reaction barrel (32) is mounted on an axle (33) for rotation therewith. The reaction barrel (32) has races (40) disposed in juxtaposition and circumferentially about the axle (33). Each race (40) is disk-like in shape, has an outer rim, and may be juxtapositioned adjacent to another race (40). The reactor barrel (32) is provided with a plurality of rocket nozzles (41) on each race (40), and rocket nozzles (41) on adjacent races (40) may be in staggered alignment with the rocket nozzles (41) of an adjacent race (40). The stream flow is channeled to and expelled through the rocket nozzles (41), thus causing the reactor barrel (32) to rotate. The stream flow may be channeled via nozzle ducts (52) having varying lengths to control the flow to the rocket nozzles (41). Rotational energy is transferred from the reactor (32) to a generator (43) Where electrical power is produced.

12 Claims, 6 Drawing Sheets

REACTION BARREL WITH ROCKET NOZZLES IN STAGGERED ALIGNMENT AND CONNECTING DUCTS OF UNEQUAL LENGTH

This application is a division of application Ser. No. 07/748,513, filed Aug. 22, 1991, now U.S. Pat. No. 5,147,564.

TECHNICAL FIELD

This invention relates to a method and apparatus to effect the recovery of otherwise wasted energy. More particularly, this invention provides for the generation of electrical power from the energy produced from the combustion of oxidizable materials in water. Moreover, this invention provides for the recovery of mechanical energy from mixed gases and liquids from a wet oxidation, products stream flow without prior separation of the gases and liquids.

BACKGROUND ART

It is known that the wet combustion of organic materials in water will produce high pressure, heated water with enough internal energy to justify the recovery of mechanical energy. One such method of recovery includes the separation of steam from the other fluids of the mixture, utilizing an expansion turbine to produce the energy. However, the separation of steam from the fluids mix results in most of the actual energy being left in the high pressure and temperature water, and therefore not available for energy recovery. At room pressures, less than seventeen percent of the heat energy is in the fluid, and the rest is in the steam. At 2000 pounds per square inch pressure, sixty percent of the heat energy is in the water and the rest is in the steam. If the steam is separated at two thousand pounds pressure, most of the heat stays with the water, and is denied to the energy recovery from steam.

It has been found that the higher the pressure, the poorer the efficiency of separation. At 3200 pounds pressure, such as disclosed in U.S. Pat. No. 4,543,190, virtually all of the energy is in the water, because at supercritical conditions, by definition, there is no phase difference between steam and water. The problem this creates is that for every gallon of water used for power recovery, another gallon of water has to be raised to the operating pressure, and very little net energy, if any, is recovered for use outside of the system.

The problem is further complicated in that a hundred pounds of steam only yields the equivalent of ten to twenty pounds of steam in the form of electrical energy. This is due to the inherent inefficiency in the expansion turbine wherein the majority of the energy is lost when the spent steam is condensed and that heat of condensation is lost to the cooling tower.

Most energy recovery methods heretofore known in the art have consisted primarily of the type employing recirculation of hot water. There exists a need to recover the internal energy from a mixture of high pressure and high temperature water with the gases of combustion, all in the heterogeneous mixture typical of the wet oxidation process.

DISCLOSURE OF THE INVENTION

It is thus an object of the present invention to provide a method and apparatus for the continuous recovery of energy from a wet oxidation, products stream flow.

It is another object of the present invention to enhance the efficiency of the extraction of thermal energy from a steam, water and gas mix by improving the mechanics of spent steam condensation.

It is a further object of the present invention to simultaneously extract kinetic energy from water, vapor, and gas.

It is yet another object of the present invention to provide for the extraction of kinetic energy from heat energy from the pressurized fluids mix of wet combustion.

These and other objects of the present invention, which will become apparent from the description to follow, are accomplished by the improvements hereinafter described and claimed.

In general, an energy recovery assembly for recovering energy from a wet oxidation, products stream flow includes a reaction barrel rotatably mounted about an axle. The reaction barrel has at least one race and each race has at least one rocket nozzle disposed thereon. Conduits are provided to transfer the stream flow to the rocket nozzles, such that the stream flow is expelled through the rocket nozzles causing the reaction barrel to rotate about the axle.

The method of recovering energy from a wet oxidation products stream flow includes the steps of directing the stream flow to the reaction barrel. The stream flow is channeled to each of the rocket nozzles in order to cause the reaction barrel to rotate about the axle. Rotational energy from the reaction barrel is imparted to a generator whereby electrical energy is generated.

A preferred exemplary energy recovery assembly incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
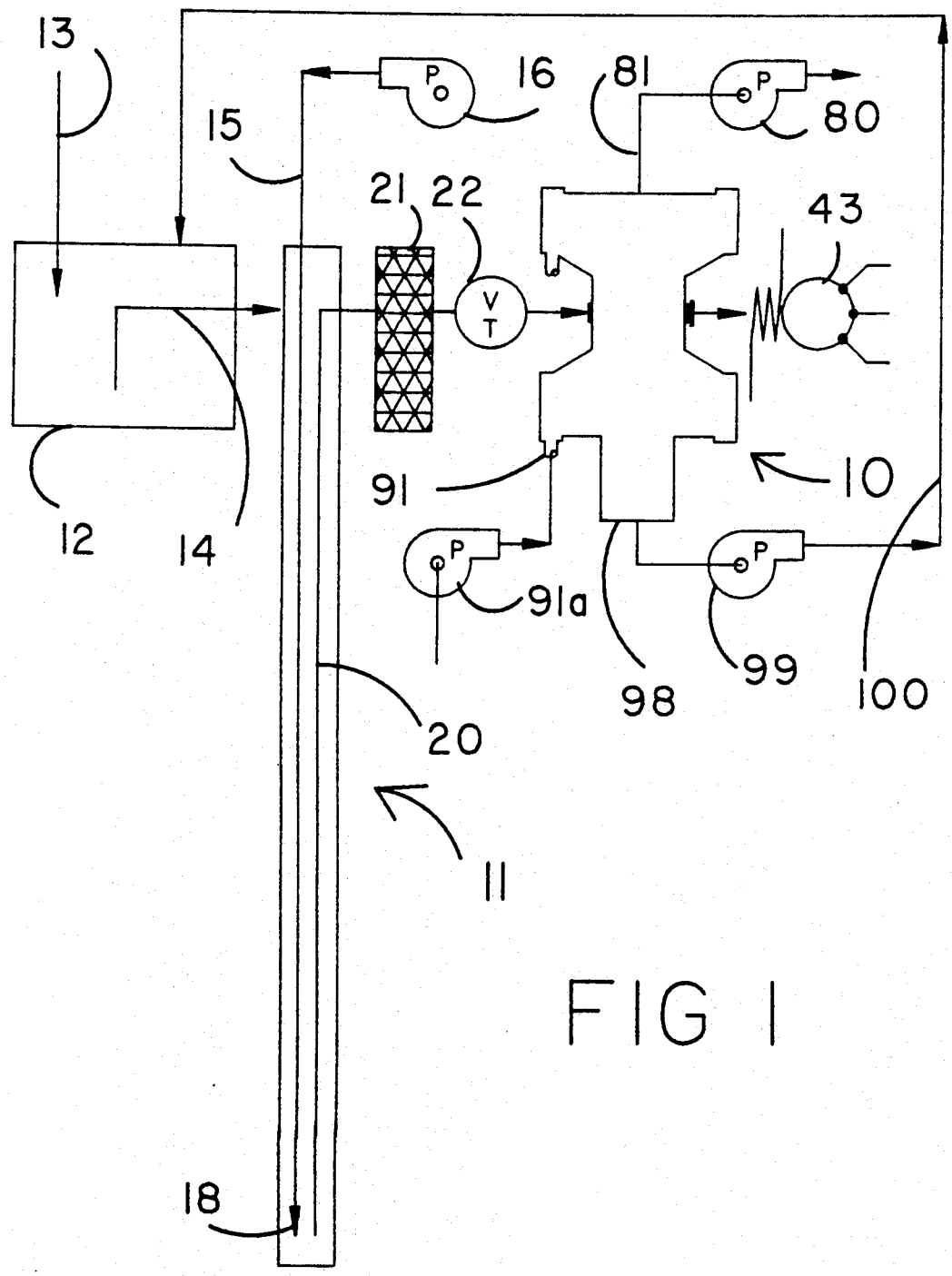
FIG. 1 is a schematic representation of a wet combustion device illustrating its interrelation with a power recovery assembly according to the present invention.

A power recovery assembly according to the present invention is schematically shown in FIG. 1 and generally indicated by the numeral 10. Assembly 10 is shown in an exemplary environment, namely, as employed with a gravity pressure reactor vessel generally indicated by the numeral 11. As is known in the art, a gravity pressure reactor vessel 11 may be employed to facilitate wet oxidation of various organic materials. Such a vessel is disclosed in U.S. Pat. No. 4,792,408 to which reference is made for a further understanding of one possible environment for the subject invention. However, assembly may be employed with any wet oxidation, products stream flow.

In the environment of a gravity pressure reactor vessel 11, a tank 12 receives a water, fuel or waste mix via feed stream 13. A typical waste product feed stream 13 may consist of about one pound of organic material for every ten pounds of water. The feed stream is usually blended in tank 12 in order to equalize the organic content to the reactor vessel 11. The organic constituent may vary from municipal sludge, hazardous waste, coal, peat or any other such material. The exact nature of the feed stream 13 is not critical to the present invention, and indeed, wet oxidation reactor vessels may be employed with a variety of feed stream components.

An uptake draft or reactor feed stream 14 conveys the water and fuel mix to the gravity pressure reactor vessel 11, and oxygen or air is supplied via supply line 15 and pump 16. The water and fuel mix and the air or oxygen supply are delivered to the bottom of the reactor as at 17, where wet combustion of the fuel is effected. As is known in the art, wet combustion may be accomplished at subcritical or supercritical conditions, and both combustions are within the scope of the present invention.

As described above, the feed stream components to wet oxidation reactors will vary, often from moment-to-moment. This is especially true when the reactor is employed to oxidize waste products. Therefore, the reactor products stream flow components, which are carried to the top of the reactor through updraft column 20, will also vary. For example, typical gravity pressure reactor vessels, such as reactor vessel Il, with air feed may have a products stream flow which consists of about two pounds of water for every pound of gas and typically five parts nitrogen to each part of carbon dioxide. For a pure oxygen feed system, it is often found that there will be one pound of oxygen for each pound of organics. Furthermore, outlet conditions may typically find pressures as high as 400 psi and temperatures of 380° F., or higher. Again, all outlet components and conditions may vary and still be useful with the present invention.

The wet oxidation, products stream flow is preferably filtered, as through filter 21, which may be employed to separate particulate matter, gases or liquids. However, it is preferred that all gases and liquids be passed through filter 21 in order to recover as much energy as possible from the stream flow. After passing through filter 21, the filtered stream flow may be conveyed to a control valve 22 which may be employed to regulate the stream flow to the energy recovery assembly 10.

Figure 4:
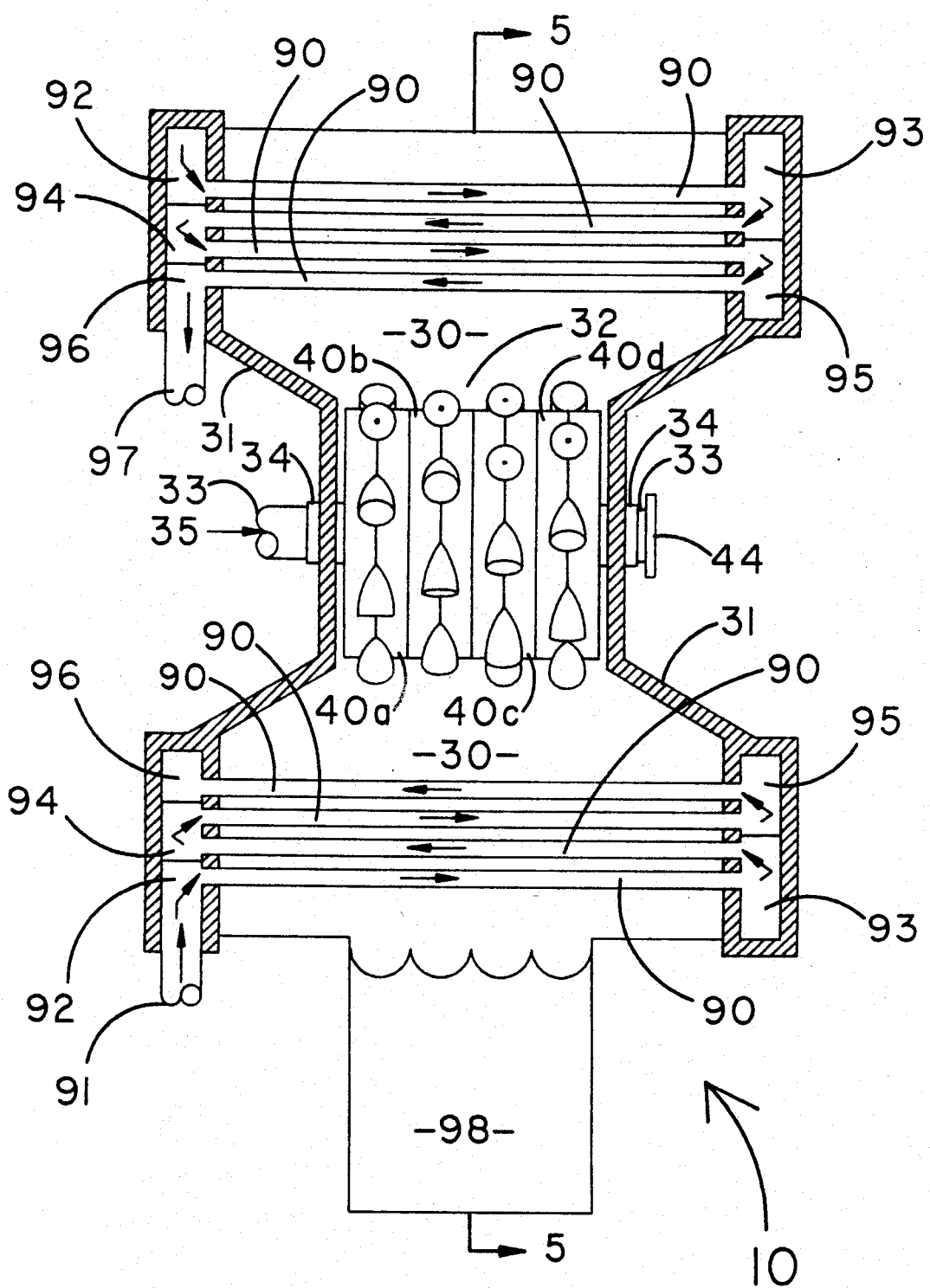
FIG. 4 is a partially sectioned side elevational view of the reaction barrel of FIG. 2.

As shown in FIG. 4, energy recovery assembly 10 includes an enclosed chamber 30 as defined, for example, by chamber walls 31. Chamber walls 31 support a reaction barrel generally indicated by the numeral 32. Reaction barrel 32 is rotatably mounted about an axis such as defined by an axle 33. Axle 33 is supported by chamber walls 31, and is preferably provided with a water tight shaft seal 34. The products stream which is carried by updraft column 20 preferably flows through axle 33, which for that purpose is provided with a bore 35.

Reaction barrel 32 includes at least one, and preferably more than one, disk-like race 40 affixed to and otherwise rotatable with axle 33. In the embodiment depicted in the drawings, reaction barrel 32 is shown as including four races 40a–40d. It is preferred that each disk-like race 40a–40d be supported in juxtaposition with the adjacent race, and circumferentially about axle 33.

Figure 2:
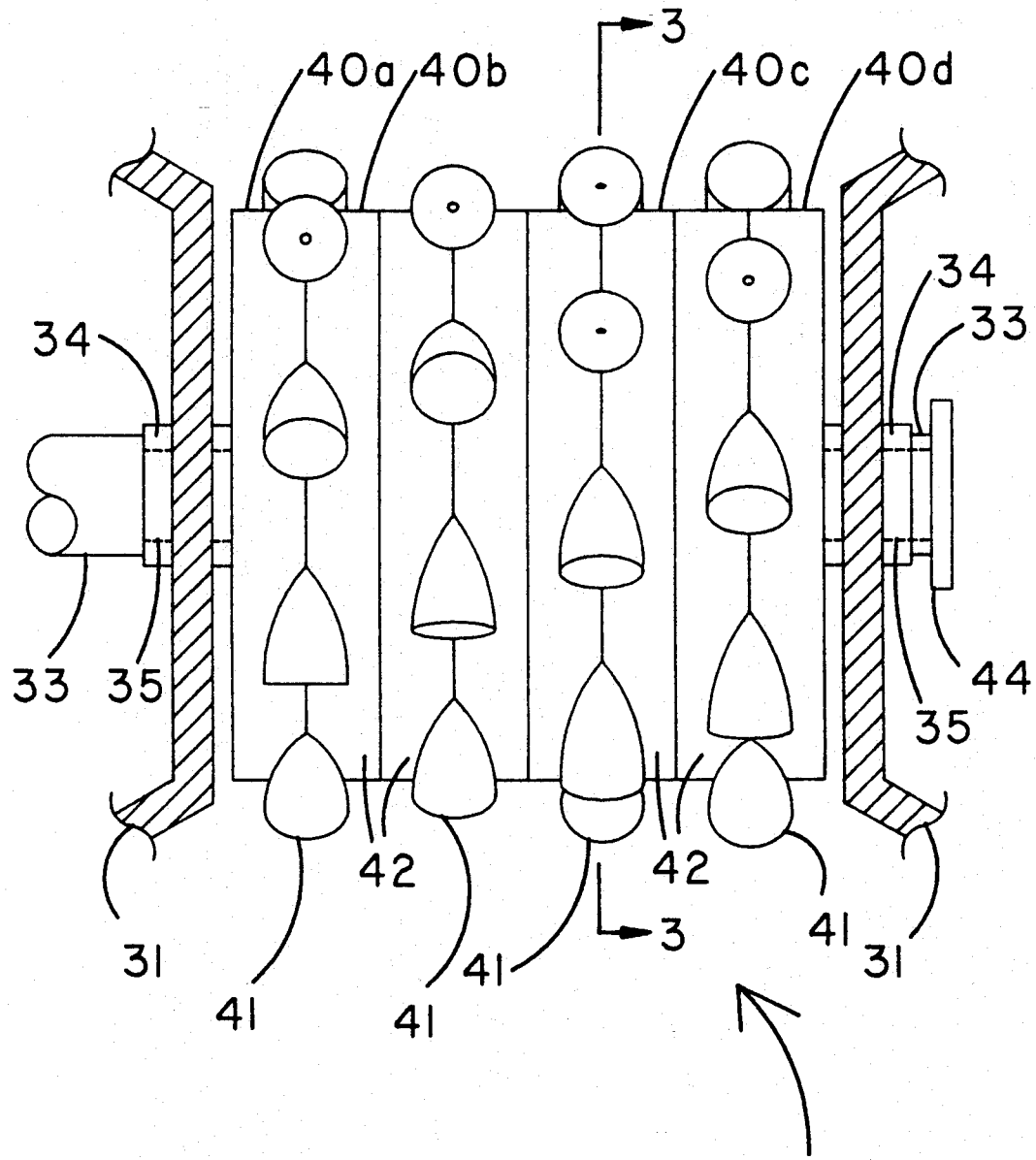
FIG. 2 is a sectional, side elevational and partially broken away view of a power recovery reaction barrel according to the present invention.
Figure 3:
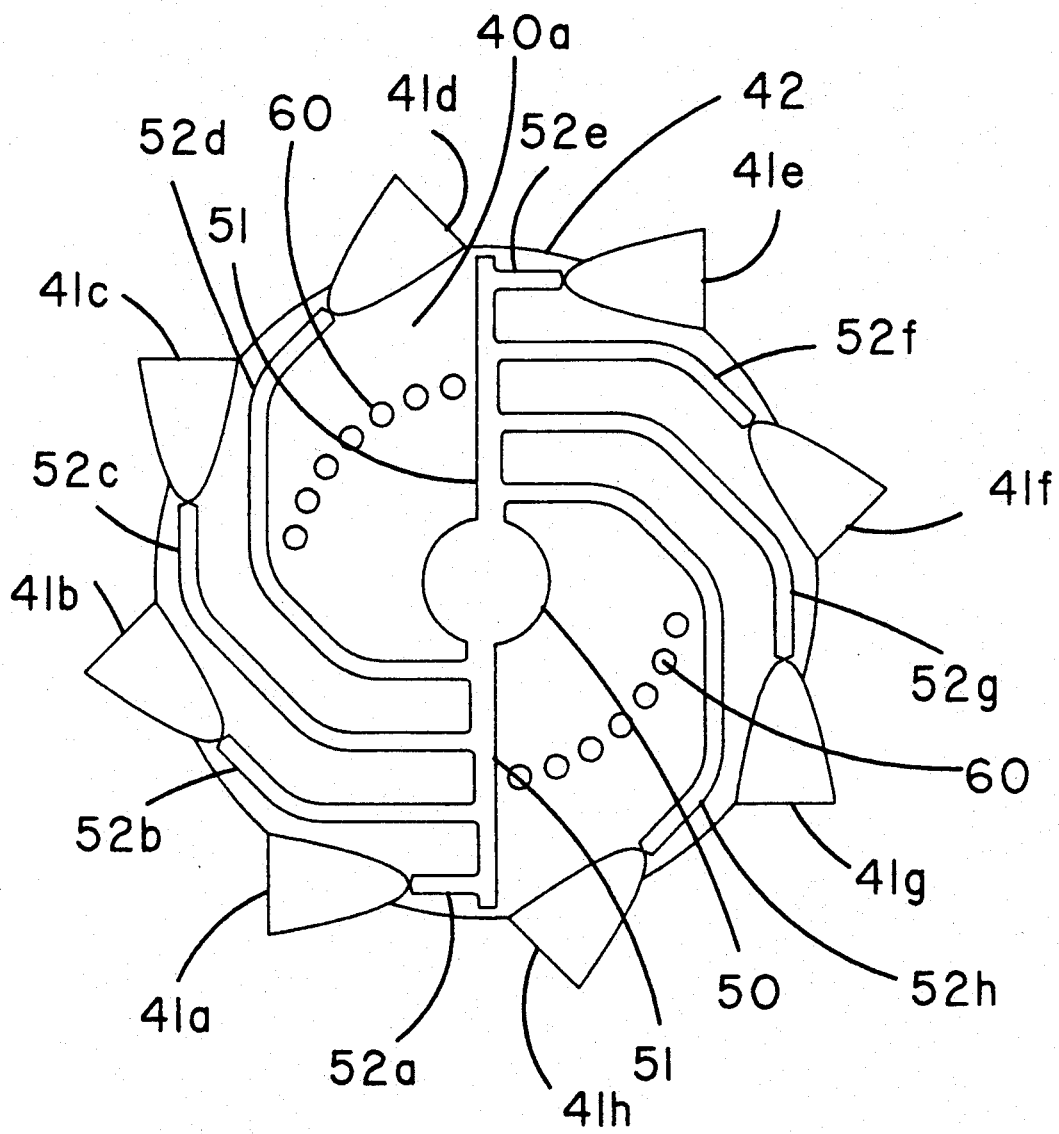
FIG. 3 is a sectional view taken substantially along line 3—3 of FIG. 2.

As shown in FIG. 3, each race such as race 40a, is provided with a number of rocket nozzles 41 such as rocket nozzles 41a–41h. Rocket nozzles 41 are evenly spaced on the outer rim 42 of disk-like race 40a. As will be further described hereinbelow, there is provided a conduit network for transferring the reactor products stream flow to the rocket nozzles 41. Water, flashing steam and expanding gases are expelled through rocket nozzles 41, which causes reaction barrel 32 to rotate about the axis of axle 33. Reaction barrel 32 is preferably attached to a standard electrical generator 43 (FIG. 1) such as via, for example, a conventional attachment coupling 44 (FIG. 2). Thus, rotation of reaction barrel 32 imparts rotational energy to the generator, causing the generator to also rotate and generate electricity thereby effecting energy recovery.

The reactor product stream flow travels via updraft column 20 to bore 35 of axle 33. Bore 35 in turn communicates with a stream flow entrance port 50 in each race 40. Stream flow entrance port 50 communicates with an entrance duct 51. As will be more fully appreciated from the discussion to follow, races 40a–40d may be provided with more than one entrance duct 51, and, in fact, two such entrance ducts 51 are shown in FIG. 3. Each duct 51 connects and communicates with a plurality of nozzle ducts 52. The number of nozzle ducts 52 corresponds to the number of rocket nozzles 41 for each race 40.

With reference to FIG. 3, a reactor products stream flow which is channeled through bore 35, enters stream flow entrance port 50. The stream flow travels along each entrance duct 51, then along each nozzle duct 52, and is then expelled through each rocket nozzle 41, causing the rotation of reaction barrel 32 described hereinabove. Thus, each successive element of the conduit network, i.e., bore 35, entrance duct 51 and nozzle duct 52, communicates with the next element. By "communicate" it is understood to mean connecting such that liquids, vapor, gases and the like, may pass from one to the other. Wet oxidation product stream flows have high pressure and temperature characteristics. Thus, the stream flow is caused to travel wherever a communicating conduit is placed.

It is known that wet oxidation reactor, products stream flows may include bubbles, which because of the different flow velocities between gases and liquids, will cause burst events in the flow. Therefore, in order to compensate for these burst events, nozzle ducts 52 are of varying length in relation to their proximity to entrance port 50. For example, as shown in FIG. 3, nozzle duct 52a is shorter in length than nozzle duct 52b, which is itself shorter than 52c and so forth, to the longest nozzle duct 52d. Furthermore, nozzle duct 52a is the same length as nozzle duct 52e; nozzle duct 52b is the same length as nozzle duct 52f; nozzle duct 52c is the same length as nozzle duct 52g; and, nozzle duct 52d is the same length as nozzle duct 52h. Therefore, when a burst event or normal high pressure steam/water/gas flow event enters through entrance port 50, it is caused to travel through entrance duct 51. A portion of the event then enters nozzle ducts 52d and simultaneously, nozzle duct 52h. The remaining portions of the event continue to travel along entrance duct 51, where another portion of the event simultaneously enters nozzle ducts 52c and 52g, and so forth, until the last portions of the event simultaneously enters nozzle ducts 52a and 52e.

By "event" as used herein, it is understood to mean a burst event or other flow of steam, water, gas or other components as may be ducted to the reaction barrel 32 for energy recovery.

This arrangement of lengths of nozzle ducts 52, ensures that the event is discharged from opposite rocket nozzles 41 simultaneously. That is, a portion of the event will be expelled through nozzle duct pairs 41d and 41h at the same moment. Similarly, the event will be expelled from rocket nozzle pairs 41c and 41g; 41b and 41f; and, 41a and 41e simultaneously.

It is further preferred that a simultaneous expulsion of an event from a rocket nozzle 41 pair be staggered from all other pairs in the given race 40. That is, the event is expelled from rocket nozzle pair 41a and 41e at a different moment than it is expelled from rocket nozzle pairs 41b and 41f.

This staggered expulsion of the event, together with simultaneous expulsion from opposite pairs of rocket nozzles 41, insures that an equal and opposite force is exerted upon a given race 40, and that the rotation of the race 40 about axle 33 is as smooth as possible. By further staggering the rocket nozzles 41 of each juxtaposed race 40, the rotation of reaction barrel 32 is assured of being smooth, thus decreasing wear and fatigue potential.

It is still further preferred as depicted in FIG. 3, to vary the diameter of entrance duct 51 between each successive nozzle duct 52 with which it communicates. Thus, the diameter of entrance duct 51 proximate to entrance port 50 is wider than that of entrance duct 51 proximate nozzle duct 52a. One skilled in the art will appreciate the diameters and lengths of entrance duct 51, as well as the diameters and lengths of nozzle ducts 52 necessary to achieve the staggered, equal and opposite events discussed hereinabove.

By way of example only, the length of entrance duct 51 and nozzle duct 52a (and hence 52e) may be one foot. That is, the distance between entrance port 50 and rocket nozzle 41a (and similarly, between entrance port 50 and rocket nozzle 41e) may be one foot. Between entrance port 50 and rocket nozzle 41b (and 41f) may be 1.25 feet; between entrance port 50 and rocket nozzle 41c (and 41g) may be 1.50 feet; and, between entrance port 50 and rocket nozzle 41d (and 41h) may be 1.75 feet long. If an event (a mixture of air, $CO_2$, water, steam and the like) enters through entrance port 50 at 25 feet per second, the event will arrive simultaneously at rocket nozzle pair 41a and 41e after 0.04 seconds; at rocket nozzle pair 41b and 41f after 0.05 seconds; at rocket nozzle pair 41c and 41g after 0.06 seconds; and, at rocket nozzle pair 41d and 41h after 0.07 seconds. Thus, the event is expelled from rocket nozzle 41 pairs simultaneously, while being staggered from pair to pair, and the overall wear of reaction barrel 32 is decreased. Furthermore, the speed of the rotation of reaction barrel 32 is increased, as is efficiency of energy recovery.

It is also preferred that each rocket nozzle 41 of each race 40 be staggered with respect to the rocket nozzles 41 of the immediately juxtaposed race 40 (FIG. 2). In order to provide for such staggered alignment of each rocket nozzle 41, each race 40 may be provided with a plurality of apertures 60 (FIG. 3). Apertures 60 may be used as bolt holes, so that each juxtaposed race 40 is connected to the adjacent race 40 by a different bolt hole or aperture 60 than the adjacent race. Fastening bolts are not depicted in the drawings, and it will be appreciated that staggered alignment of the rocket nozzles 41 may be accomplished by other methods.

Figure 6:
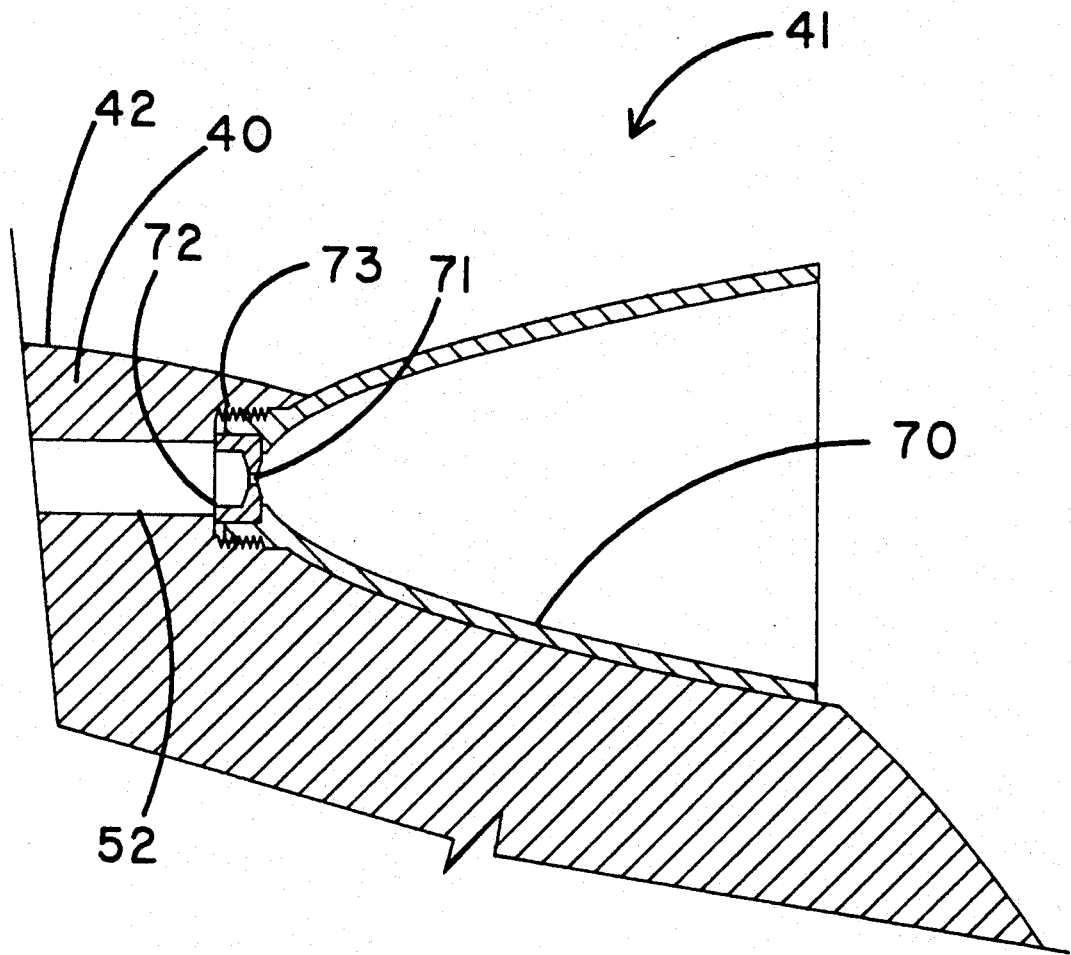
FIG. 6 is a sectional view of a rocket nozzle device as employed by the present invention.

Each rocket nozzle 41, as shown in FIG. 6, has an inner surface 70 shaped for efficient expansion of fluids and gases which are expelled at high velocity through a relatively small orifice 71, formed by orifice walls 72. As will be appreciated by one skilled in the art, the shape of rocket nozzle inner surface 70 and the size of orifice 71 may vary depending upon fluid hydrodynamics. Also, the exact material of which orifice walls 72 are fabricated is not critical, but it is preferred that it be a ceramic or other material not prone to erode rapidly under adverse conditions.

For the sake of maintenance, orifice 71 may be expendable by making orifice walls 72 threadably or otherwise disengageable from rocket nozzle 41. Rocket nozzle 41 may also be provided with threads, as at 73, which mate with corresponding threads on race 40. Thus, each rocket nozzle 41 is removable from race 40 to provide access to orifice 71, and for other maintenance purposes.

Figure 5:
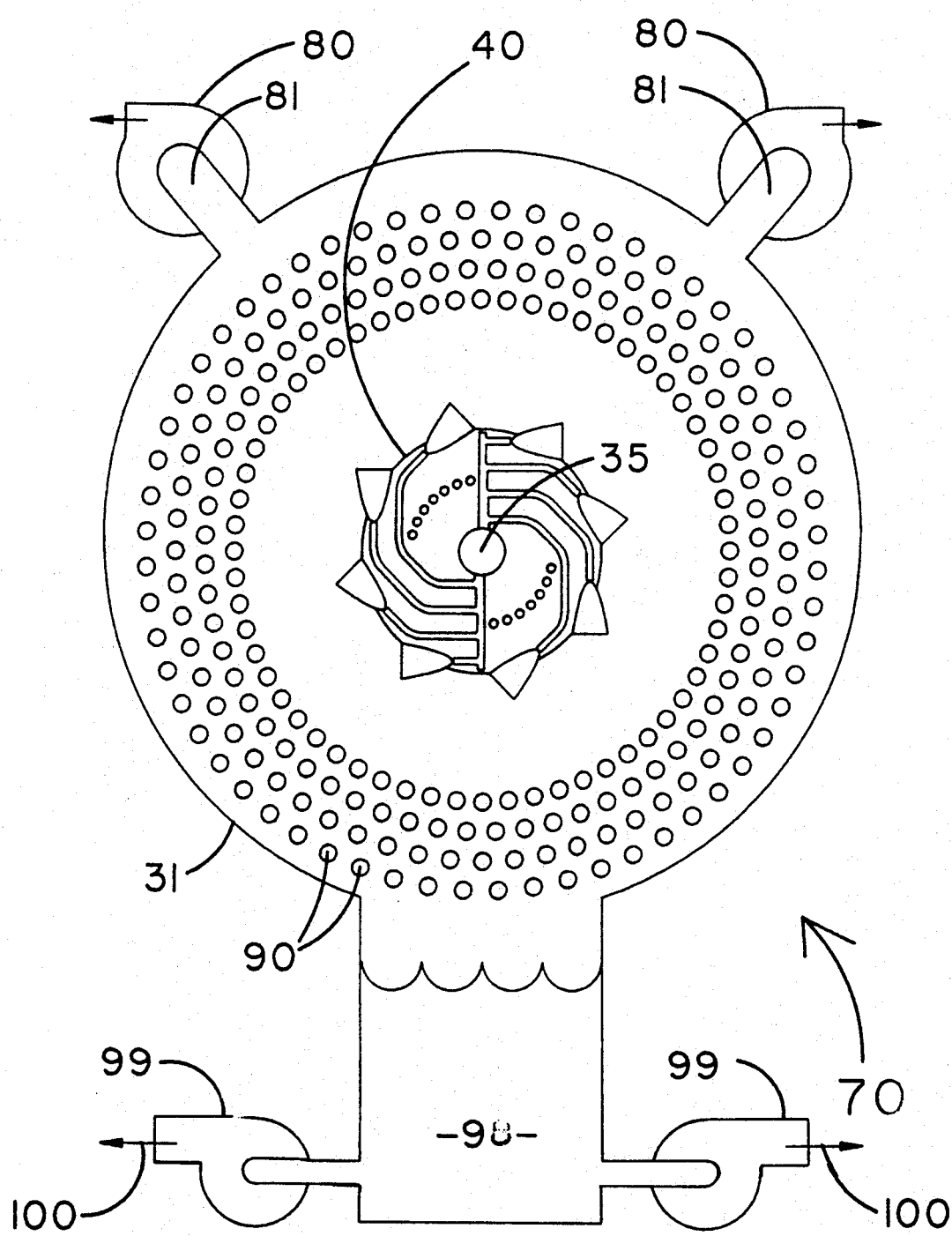
FIG. 5 is a sectional view taken substantially along line 5—5 of FIG. 4.

Chamber 30 may be a vacuum chamber which has vacuum pressure regulated as by vacuum pumps 80 connected to chamber 30 via connector 81 (FIGS. 1 and 5). By lowering the pressure in chamber 30, more water in the pressurized stream flow channeled to rocket nozzles 41 is flashed to steam. Because of the presence of certain noncondensable gases, it is difficult to obtain a vacuum, although pressures as low as 0.5 atmospheres or lower may be obtained. The exiting water, through orifice 71, has a set level of energy content. That is, after the pressure drop, the water can only contain a set level of energy. The remaining energy must be lost in throttling and converted by phase change to steam. The thrust imposed by the rocket nozzles 41 is a function of all of the gases present, such as steam, carbon dioxide, oxygen and nitrogen. The lower the pressure in chamber 30 when this liquid/vapor/gas mixture exits rocket nozzle 41, the larger the volume of the gases and flashing steam. The larger the volume of the gases and flashing steam, the greater the escape velocity from the rocket nozzle 41, and as known in the art, the greater the thrust imparted. The greater the thrust imparted, the more efficient is the generation of electricity by generator 43.

Referring to FIGS. 4 and 5, it is preferred that chamber 30 be cooled by water provided in cooling conduits 90. Incoming cooling water is provided through water feed 91, such as by use of a pump 91a (FIG. 1), which directs water to a first ring water chest chamber 92. Water then passes through a cooling conduit 90 to a second ring water chest chamber 93, which causes the now partially warmed water to be directed to another ring water chest chamber 94. This same pathway continues through conduits 90 in the direction shown by arrows in FIG. 4, through successive ring water chest chambers 95 and 96. From ring water chest chamber 96, the heated water is extracted via outlet 97, where it may be collected. As will be appreciated by one skilled in the art, the counterflow between cooling water and condensing steam exiting rocket nozzles 41 will increase the efficiency of the system.

It will be appreciated that water cooling conduits 90 may be tap water or water from another source at numerous temperatures. However, it is preferred that the water in cooling conduits 90 be cooled, such as by a cooling tower (not shown) and a heat exchanger using liquid oxygen evaporation (not shown). The evaporated oxygen may then be directed to gravity pressure reactor vessel 11 to supply the necessary oxygen for oxidation. It is preferred that the cooling water be recirculated from such a heat exchanger to cooling conduits 90, and back again in a closed system.

Further, a wet well 98 is provided to collect condensate, which may be removed by water removal pumps 99. A wet well conduit 100 may recycle water to tank 12 for reuse of residual heat which may reside in the water.

It is known that the energy in water under pressure can be extracted using a water wheel or water turbine. However, the energy derived from the wet oxidation of combustible materials is unique. The vast majority of its energy is not in the water pressure itself, but rather is in the heat energy content of the fluids mix.

The potential energy in water at 400 pounds per square inch (psi) can be represented as a head of pressure expressed in feet of a water column 920 feet high. By pushing twenty-three gallons per minute to this height, or 3.2 pounds per second, there would be 2,944 foot pounds per second or the energy equivalent of about four Kilowatts. The temperature of the water is not involved to any significant degree.

If that same twenty-three gallons per minute were forced through a one quarter inch diameter orifice, the water would exit at about 180 feet per second. The water from Wet oxidation is thermally saturated which means a portion of it will flash to steam. Moreover, the entrained air will discharge as an aerosol increasing the velocity further. A specific product of combustion, carbon dioxide, which under the delivery pressures will likely be in the form of a dissolved carbonic acid, will revert to a gas on sudden release of pressure, and enhance the rocket effect of the fluids emerging from rocket nozzles 41 into the partially evacuated chamber 30. Because of this, when it is desirable to dilute the strength of the oxygen feed to the wet oxidation process, the use of carbon dioxide gas is recommended. The combined vapor and gases, steam, air, and carbon dioxide will produce as much as a nine fold increase in the overall exit velocity. About half of this is attributable to the steam and half attributable to the noncondensable gases, depending on the degree of partial evacuation of the chamber.

The formula for power production from a jet of fluid is the mass multiplied by the difference in velocity of the jet and the velocity of the device, multiplied by the velocity of the device. If a preselected diameter of for example three feet, and a rotation of 1760 revolutions per minute is selected (not necessarily the optimum), all of the variables are known. The same twenty-three gallons per minute of the previous example would produce 40,615 foot pounds per second or nearly fifty-five Kilowatts.

In terms of efficiency, fifty-five Kilowatts amounts to 52,129 British Thermal Units per second or 187,664 Dritish Thermal Units per hour. The twenty-three gallons per minute equates to 11,523 pounds per hour, with a heat loss from 440° F. to 212° F. of 2,800,000 British Thermal Units per hour, most of which will end up in the cooling system.

The above example employing twenty-three gallons per minute as a product stream flow from a reactor vessel is exemplary only, and is not a limitation of the present invention. For instance it is known that deep well gravity pressure reactor vessels will often produce a flow in a range of 130 to 2300 gallons per minute. The latter flow will produce as much as 5500 Kilowatts of recovered energy.

It should thus be evident that the method and apparatus disclosed herein is capable of recovering energy from a wet oxidation stream flow. One skilled in the art will appreciate that the method and device as exemplified herein may be varied without departing from the scope of the invention. Moreover, the invention includes all such modifications and variations that fall within the scope of the attached claims.

I claim:

1. Apparatus for recovering energy from a wet oxidation, products stream flow comprising a reaction barrel mounted on an axle for rotation therewith; said reaction barrel having a plurality of races disposed in juxtaposition and circumferentially about said axle; wherein each said race is disk-like in shape, and has an outer rim; rocket nozzle means disposed on each said race; said rocket nozzle means including a plurality of nozzles disposed upon and evenly spaced upon said rim of each said race in staggered alignment with said nozzle of the respective immediately adjacent at least one said race, conduit means to transfer a wet oxidation, products stream flow to said rocket nozzle means; such that the stream flow is expelled through said rocket nozzle means causing said reaction barrel to rotate.

2. Apparatus according to claim 1, further comprising a vacuum chamber housing said reaction barrel.

3. Apparatus according to claim 2, further comprising a vacuum pump for said chamber, and means to regulate vacuum pressure within said chamber.

4. Apparatus according to claim 1, wherein, for each said rate, said rocket nozzle means includes a plurality of nozzles, a conduit means including a stream flow entrance port, and a plurality of first ducts in communication with said port and said nozzles.

5. Apparatus according to claim 4, wherein said conduit means further includes a plurality of nozzle ducts equal to the number of said nozzles, each said nozzle duct being in communication with one said nozzle.

6. Apparatus according to claim 5, wherein said nozzle ducts are of varying length and having respective first ends spaced along said first ducts from said entrance portion, such that each said respective nozzle ducts having first ends starting with said nozzle duct which is closest to said entrance port along said first ducts, are successively longer than the next said nozzle duct along respective said first duct.

7. Apparatus for recovering energy from a wet oxidation, products stream flow comprising a reaction barrel mounted on an axle for rotation therewith; said reaction barrel having a plurality of races; rocket nozzle means disposed on each said race; conduit means to transfer the stream flow to said rocket nozzle means; said rocket nozzle means including a plurality of nozzles; said conduit means including a stream flow entrance port, and a plurality of first ducts in communication with said port and said nozzles; said conduit means further including a plurality of nozzle ducts, equal to the number of said nozzles which have respective first ends spaced along said first ducts from said entrance port, each said nozzle duct being in communication with one said nozzle; said nozzle ducts being of varying length, such that each said nozzle duct starting with said respective nozzle ducts having first ends which is closest to said entrance port along said first ducts, are successively longer than the next said nozzle duct along respective said first duct;

such that the stream flow is expelled through said rocket nozzle means causing said reaction barrel to rotate.

8. Apparatus according to claim 6, or claim 7 wherein each said race is provided with two said first ducts radiating from and in communication with said entrance port.

9. Apparatus according to claim 8, wherein said race is provided with four said nozzle ducts radiating from and in communication with each said first duct.

10. Apparatus according to claim 1 or claim 7 further comprising a chamber housing said reaction barrel and means to cool said chamber.

11. Apparatus according to claim 10, wherein said means to cool includes a plurality of ring water chest chambers surrounding said reactor barrel.

12. Apparatus according to claim 11, wherein said chamber includes a wet well to collect condensate.

* * * * *